No. 836,455. PATENTED NOV. 20, 1906.
S. D. McGUIRE.
CULTIVATOR.
APPLICATION FILED APR. 17. 1906.

2 SHEETS—SHEET 1.

Witnesses
Jas. H. Blackwood
W. O. Blackwood.

Inventor
Squire O. McGuire
By James K. Polk
Attorney

No. 836,455. PATENTED NOV. 20, 1906.
S. D. McGUIRE.
CULTIVATOR.
APPLICATION FILED APR. 17, 1906.

2 SHEETS—SHEET 2.

Witnesses
Jos. H. Blackwood
W. C. Blackwood

Inventor
Squire D. McGuire
By James K. Polk
Attorney

UNITED STATES PATENT OFFICE.

SQUIRE D. McGUIRE, OF ARKOE, MISSOURI, ASSIGNOR OF ONE-HALF TO JEFFERSON C. HOCKER, OF SAN DIEGO, CALIFORNIA.

CULTIVATOR.

No. 836,455.   Specification of Letters Patent.   Patented Nov. 20, 1906.

Application filed April 17, 1906. Serial No. 312,192.

*To all whom it may concern:*

Be it known that I, SQUIRE D. McGUIRE, a citizen of the United States, and a resident of Arkoe, in the county of Nodaway and State of Missouri, have invented certain new and useful Improvements in Cultivators, of which the following is a full and complete specification.

My invention relates to machines for cultivating growing crops, and has for its object the provision of a device with conical-shaped rollers to straddle the row of growing corn, potatoes, and other vegetation planted in rows, the purpose of said rollers being to break up and pulverize the soil and leave a smooth surface inclined toward the row to reflect the sun's rays thereon, as well as to deflect the rain-water thereto. The conical-shaped rollers are arranged in pairs at the front and rear of the machine, and intermediate thereof are cultivating disks or blades journaled on swinging wing-frames, so that the pitch of the blades and the depth of the cut may be regulated to suit the nature of the work to be performed, side boards being provided to prevent the soil from being thrown onto the growing plants.

My invention will be described in detail hereinafter and illustrated in the accompanying drawings, in which—

Figure 1:
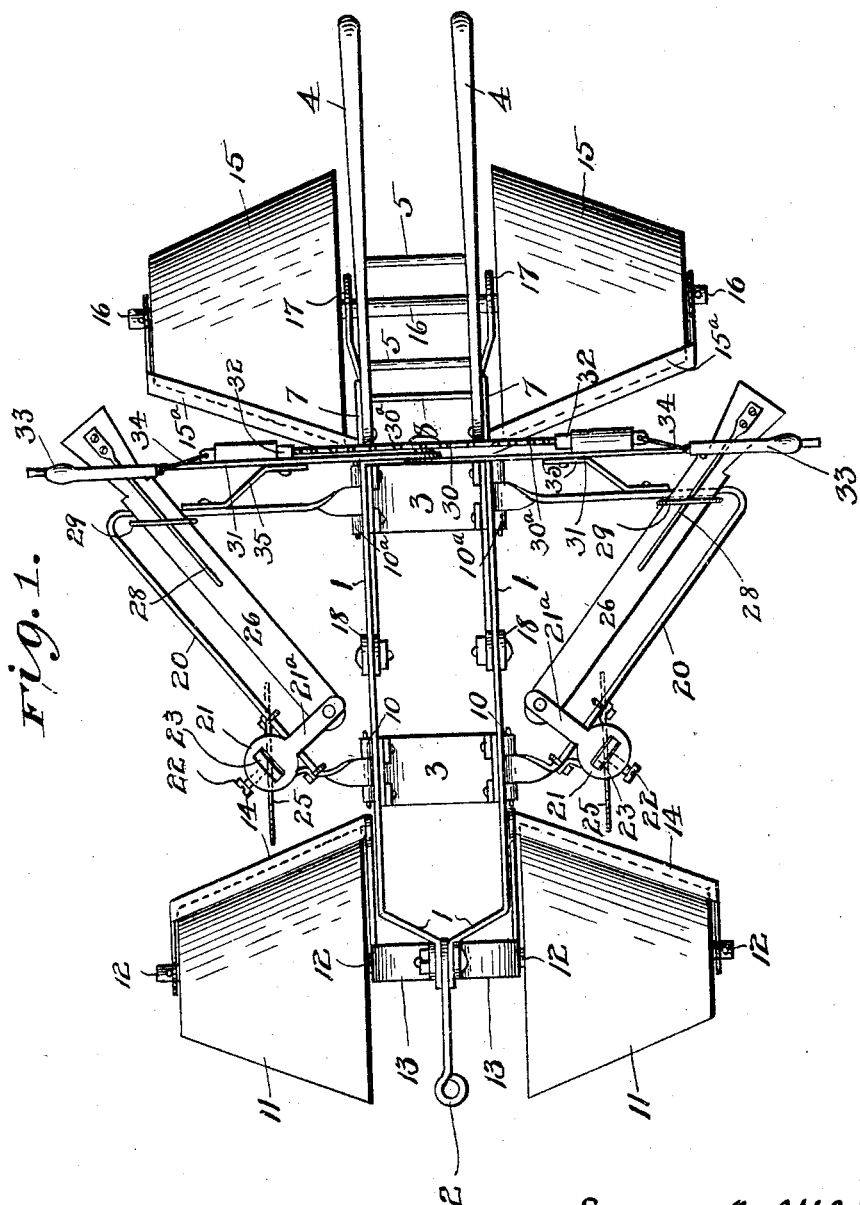
Figure 2:
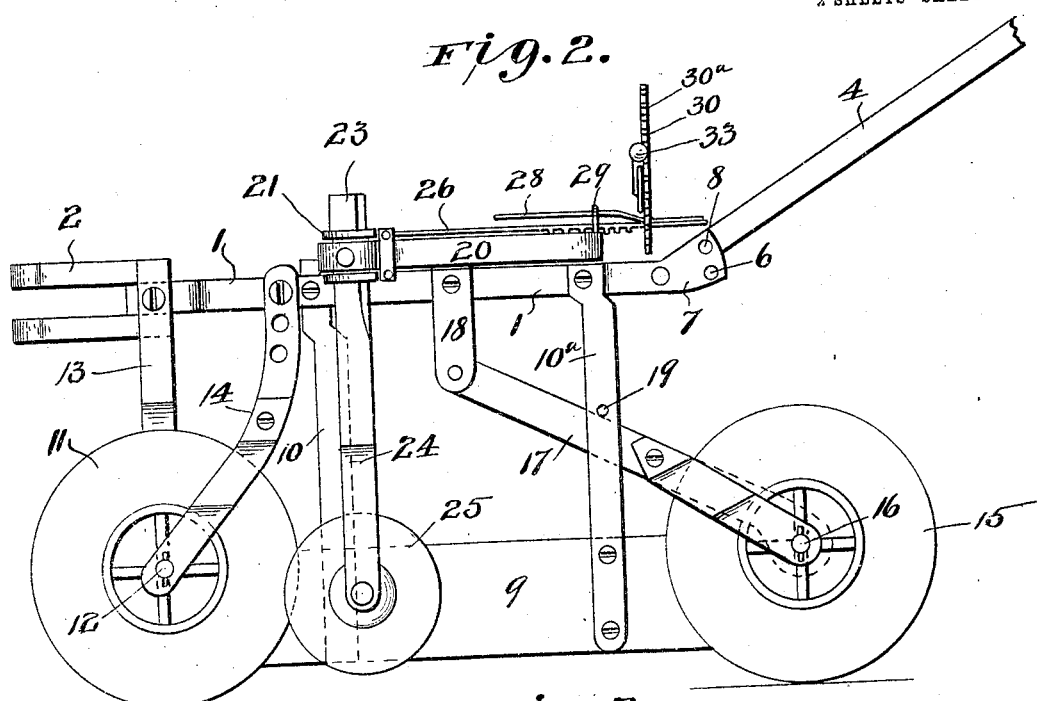
Figure 3:
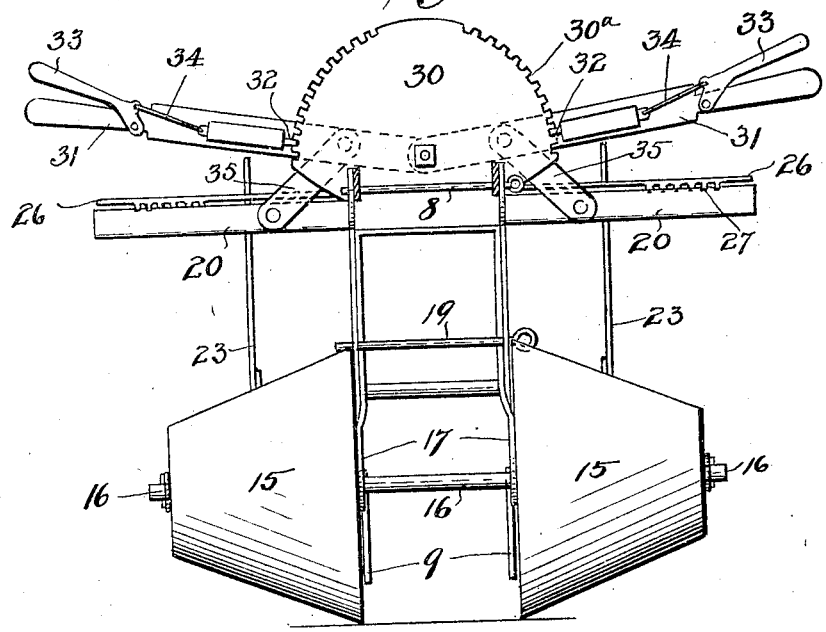

Figure 1 is a top plan view of my improved cultivator; Fig. 2, a side view, and Fig. 3 a rear view.

In the drawings similar reference characters indicate corresponding parts throughout the several views.

Inasmuch as my device is to be used as a straddle-row cultivator, it is desirable that the operator may be able to see the row of plants, so as to guide the device for most effective work, and I therefore provide a draft-frame consisting of two beams 1, bent at their forward ends toward one another and secured to a clevis 2, to which are attached the draft-animals. Cross-braces 3 connect beams 1, so as to space them apart for the purpose stated, and at the rear of the beams are pivotally secured the handles 4 for the operator, which are also braced by cross-pieces 5, as in the common construction of plow-handles. The height of the handles may be arranged to suit the convenience of the operator by means of the series of holes 6 in the plates 7 at the rear end of beams 1, and the rod 8, which is removable, so that it can be secured through any pair of the holes 6.

9 indicates side boards secured to beams 1 by means of vertical bars 10 and 10ª at the front and rear of the machine, respectively.

11 represents conical-shaped rollers journaled on shaft 12, supported by braces 13, secured at the front end of beams 1, said rollers being spaced apart, so as to straddle the row of growing plants. 14 indicates other braces secured to beams 1 and to the outer ends of the shaft 12 to make a more stable construction. The edges of said braces may be so shaped, if desired, as to act as scrapers for the surface of the rollers. 15 indicates other conical-shaped rollers journaled on shaft 16, secured to arms 17, pivotally secured to hangers 18 on beams 1, said rollers being located, as shown, at the rear of the machine.

19 represents a rod secured through holes in vertical bars 10ª to limit the upward movement of rollers 15 relative to the balance of the machine, or, if desired, the rod 19 may be removed, and the rollers 15 will then be held in place by their weight.

20 indicates an angular wing hinged on the side of each beam 1, while 21 indicates a plurality of turn-blocks journaled on each wing 20, in each of which is adjustably secured, by means of a set-screw 22, an arm 23 to support a cultivator-blade. In the form shown in the drawings the arm 23 is formed with its lower end forked, as shown at 24, with a disk 25 rotatably secured therein; but instead of this form of arm a straight bar may be substituted, if desired, to which may be secured any ordinary form of cultivator-blade.

21ª indicates arms extending from blocks 21, having their free ends secured to a bar 26, slidably mounted on each wing 20 and provided with notches 27 on its lower side to engage the rear side of its supporting-wing 20, the purpose of said construction being to regulate the angle of the cultivating-disks 25, a spring 28 being secured to each bar 26 and bearing against guide 29 to hold the notches in engagement with the said wing 20.

30 indicates a semicircular plate secured to the top of beams 1 and transversely thereof and having notches 30ª in its edge.

31 indicates levers fulcrumed on plate 30 and having spring-actuated sliding pawls 32 mounted thereon to engage the notches 30ª, said pawls being actuated by means of grip-levers 33, secured to said pawls by means of rods 34.

35 indicates links secured to levers 33 and the rear side of wings 20, the purpose of this construction being to provide for swinging wings 20 so as to regulate the depth of cut and pitch of the cultivator-disks 25 and to raise them into an inoperative position when the machine is not in operation.

It will be understood that, if desired, my cultivator is capable of being arranged in gangs of two or more by connecting the clevises of the several machines with rods and securing the draft appliances thereto. I do not show this feature in the drawings, as such construction would be readily understood by any one familiar with the operation of farm machinery and because I do not consider that such duplication of machines would be a patentable feature *per se*.

In operation it will be found that the conical-shaped rollers insure easy guiding of the machine, as tilting the machine to one side of the perpendicular will throw the weight on the rollers on that side of the machine and cause the machine to sheer to that side, while by keeping the weight of the machine equally on all of the rollers will prevent side draft, because of the resistance offered by the inner edges of the rollers.

Having thus described my invention, what I claim is—

1. In a cultivator, a frame, rollers journaled thereon, angular wings hinged to said frame, cultivating devices rotatably secured to said wings, means to simultaneously rotate the cultivating devices on each wing and means to adjust the wings relatively to said frame, substantially as shown and described.

2. In a cultivator, a frame, conical-shaped rollers journaled thereon, angular wings hinged to said frame, turn-blocks journaled on said wings, arms extending from said blocks, bars secured to said arms, a vertical arm adjustably secured in each block, cultivator-disks rotatably secured to said vertical arms, and means to adjust the wings relative to said frame, substantially as shown and described.

3. In a cultivator, a frame, conical-shaped rollers journaled thereon, angular wings hinged to said frame, turn-blocks journaled on said wings, arms extending from said blocks, bars secured to said arms, a vertical arm adjustably secured in each block, cultivator-disks rotatably secured to said vertical arms, a semicircular notched plate secured to said frame, levers fulcrumed on said plate, links connecting said levers and the wings, and spring-actuated pawls on said levers to engage the notches in said plate, substantially as shown and described.

In witness whereof I have hereunto set my hand in presence of two subscribing witnesses.

SQUIRE D. McGUIRE.

In presence of—
GEORGE D. COOK,
GEO. W. COLE.